United States Patent
Kappelhoff

(10) Patent No.: US 7,415,817 B2
(45) Date of Patent: *Aug. 26, 2008

(54) GATHERING AND PICKING DEVICE

(75) Inventor: Hans Kappelhoff, Stadtlohn (DE)

(73) Assignee: Maschinenfabrik Kemper GmbH & Co KG, Stadtlohn (DE)

(*) Notice: Subject to any disclaimer, the term of this patent is extended or adjusted under 35 U.S.C. 154(b) by 336 days.

This patent is subject to a terminal disclaimer.

(21) Appl. No.: 10/733,548

(22) Filed: Dec. 11, 2003

(65) Prior Publication Data

US 2004/0144073 A1 Jul. 29, 2004

(30) Foreign Application Priority Data

Dec. 11, 2002 (DE) .................... 102 57 775

(51) Int. Cl.
 A01D 45/02 (2006.01)
(52) U.S. Cl. ............................ 56/64; 56/103
(58) Field of Classification Search .............. 56/104, 56/105, 107, 94, 60, 117, 64, 103; 241/260.1
See application file for complete search history.

(56) References Cited

U.S. PATENT DOCUMENTS

| 3,462,928 | A | * | 8/1969 | Schreiner et al. | ............... 56/104 |
| 5,009,061 | A | * | 4/1991 | Heuling | .................. 56/104 |
| 5,787,696 | A | * | 8/1998 | Wiegert et al. | ................ 56/104 |
| 5,916,113 | A | | 6/1999 | Johnson | .................. 56/94 |
| 2001/0003237 | A1 | * | 6/2001 | Wolters et al. | ................ 56/64 |

FOREIGN PATENT DOCUMENTS

| DE | 197 34 747 A1 | 2/1999 |
| DE | 19815571 A1 * | 10/1999 |
| DE | 100 28 887 A1 | 12/2001 |
| GB | 2012154 A * | 7/1979 |

* cited by examiner

Primary Examiner—Árpád Fábián-Kovács

(57) ABSTRACT

A gathering and picking device comprising a first gathering element that is arranged on a first side of a picking gap and a second gathering element that is arranged on a second side of a picking gap opposite the first gathering element. Both gathering elements are rotated about a predominantly vertical axes and are provided with carrier elements that grasp standing plants. The carrier elements introduce the standing plants into the picking gap and convey the standing plants over at least part of the length of the picking gap.

6 Claims, 2 Drawing Sheets

GATHERING AND PICKING DEVICE

FIELD OF THE INVENTION

The present invention is directed to a gathering and picking device with a first gathering element arranged on a first side of a picking gap and a second gathering element arranged on the second side of the picking gap opposite the first gathering element.

BACKGROUND OF THE INVENTION

U.S. Pat. No. 5,916,113 A describes a corn harvesting attachment that can be attached to a self-propelled harvesting machine, wherein a series of conveying elements with approximately vertical axes of rotation are arranged along both sides of the picking gap. The conveying elements are provided with conveying fingers that are oriented radially with respect to the axis of rotation and convey the plants along the picking gap. With respect to the conveying direction, the conveying elements are arranged, offset relative to one another, on both sides of the picking gap such that the plants are conveyed due to their alternating interaction with the conveying elements on both sides. At the inlet end of the picking gap, a conveying element is provided only on one side, wherein said conveying element is only able to laterally convey the plants into the picking gap a short distance. This means that this conveying element conveys the plants almost exclusively rearward. A conveying element is not provided on the opposite side of the inlet end, so that the plants are introduced into the picking gap only by the stalk dividers and the rounded inlet side of the stripping plate that defines the picking gap. Only a small operating width of the individual gathering and picking units can be achieved in this fashion.

DE 197 34 747 A describes a corn harvesting attachment that cuts plants standing in a field independently of the rows planted and picks the ears off the corn plants. This attachment comprises a cutting mechanism for grasping and cutting the plants independently of the crop rows, wherein the cutting mechanism comprises a rotating drum with recesses on the outer circumference to accommodate the plant stalks and a rotating cutting disk arranged underneath the drum. The plants are conveyed to conventional picking units arranged downstream of the cutting mechanism. The separated ears of the plants are then additionally conveyed by means of two chain conveyors arranged above the picking gap. In one embodiment, two adjacent cutting mechanisms feed the plants to a picking unit arranged between the cutting mechanisms. One disadvantage of this device can be seen in the relatively long structural length caused by the use of the cutting mechanisms and the picking units arranged downstream from them. This also results in a high total weight and a center of gravity of that is relatively forward.

DE 100 28 887 A describes another corn harvesting attachment, in which a gathering element rotates about an approximately vertical axis and is provided with radially oriented carrier elements grasps the stalks of plants standing in a field and conveys the plants along the picking gap of a picking device. Use of a rotating gathering element permits the operating width to be increased in comparison with conventional pickers that operate with gathering chains, since plants that stand laterally adjacent to the picking gap are also drawn in. Because the gathering element also conveys the plants through the picking gap, the structural length is reduced in comparison with the embodiment described in DE 197 34 747 A. In order to prevent possible conveying problems during the introduction of plants into the picking gap, DE 100 28 887 A proposes to arrange another conveying element that introduces the plants into the picking gap and is realized in the form of a screw conveyor or a chain conveyor on the side situated opposite to the gathering element. However, conveying problems can still arise under certain harvesting conditions.

SUMMARY OF THE INVENTION

It is an object of the present invention to provide an improved gathering and picking device such that the plants can be better gathered, in particular during unfavorable harvesting conditions.

Gathering elements are arranged on both sides of the picking gap. Both gathering elements are rotated about a predominantly vertical axes and are provided with outwardly projecting carrier elements. During the harvesting operation, the two opposing gathering elements grasp standing plants within their operating width and convey these plants into the picking gap. The operating width of the gathering elements usually extends laterally beyond the picking gap. The gathering elements also convey the plants over part of the length of the picking gap such that separate elements for realizing this function can be eliminated, and a compact design is achieved. A picking unit with one or two picking rolls draws the plant stalks downward through the picking gap so that the useful parts are separated from the plants by a stripping plate on both sides of the picking gap.

Both gathering elements convey the plants into the picking gap that lies between the gathering elements. At a given operating width of the gathering element, this makes it possible to double the operating width of the gathering and picking device. Conversely, the operating width of the gathering element can be significantly reduced (cut in half) when the given operating width of the gathering and picking device remains the same. In this case, the operational reliability of the gathering element is improved because the plants need to be laterally deflected only to a lesser degree. Unfavorable obtuse angles between the conveying direction of the gathering element and the inlet of the picking gap can be prevented by choosing a suitable configuration of the picking gap and the gathering elements.

In order to enable both gathering elements to introduce the plants into the picking gap, it is appropriate for their operating envelopes to overlap one another. The respective carrier elements may be vertically offset such that the carrier elements of one gathering element pass underneath the carrier elements of the other gathering element and collisions are prevented. In another embodiment in which the carrier elements can be arranged at the same height for reasons of uniform plant transport, the gathering elements can be driven synchronously, i.e., with the same rotational speed, and their carrier elements are angularly offset relative to one another.

In one illustrated embodiment, the gathering elements convey the plants over the effective length of the picking gap, i.e., the length over which the plants are drawn in by the picking unit. In another embodiment, an additional conveyor may be provided downstream of the gathering elements. Such an additional conveyor is particularly practical if the length of the picking gap is greater than the operating width of the gathering element. Such a conveyor may be of the same kind as the gathering elements. However, it would also be conceivable to utilize a screw conveyor or a chain conveyor. The conveyor may also be realized in the form of a spiral conveyor that is arranged on the picking rolls, and may also extend over their entire length.

DETAILED DESCRIPTION

Figure 2:
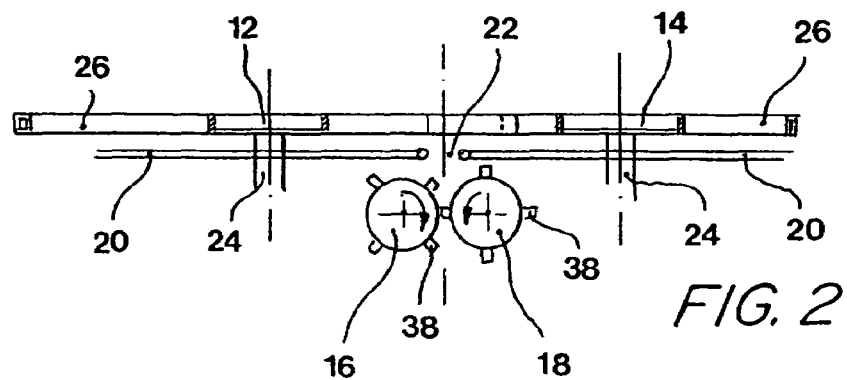
FIG. 2 is a cross sectional view through the gathering and picking device according to FIG. 1, along the line 2-2.
Figure 1:
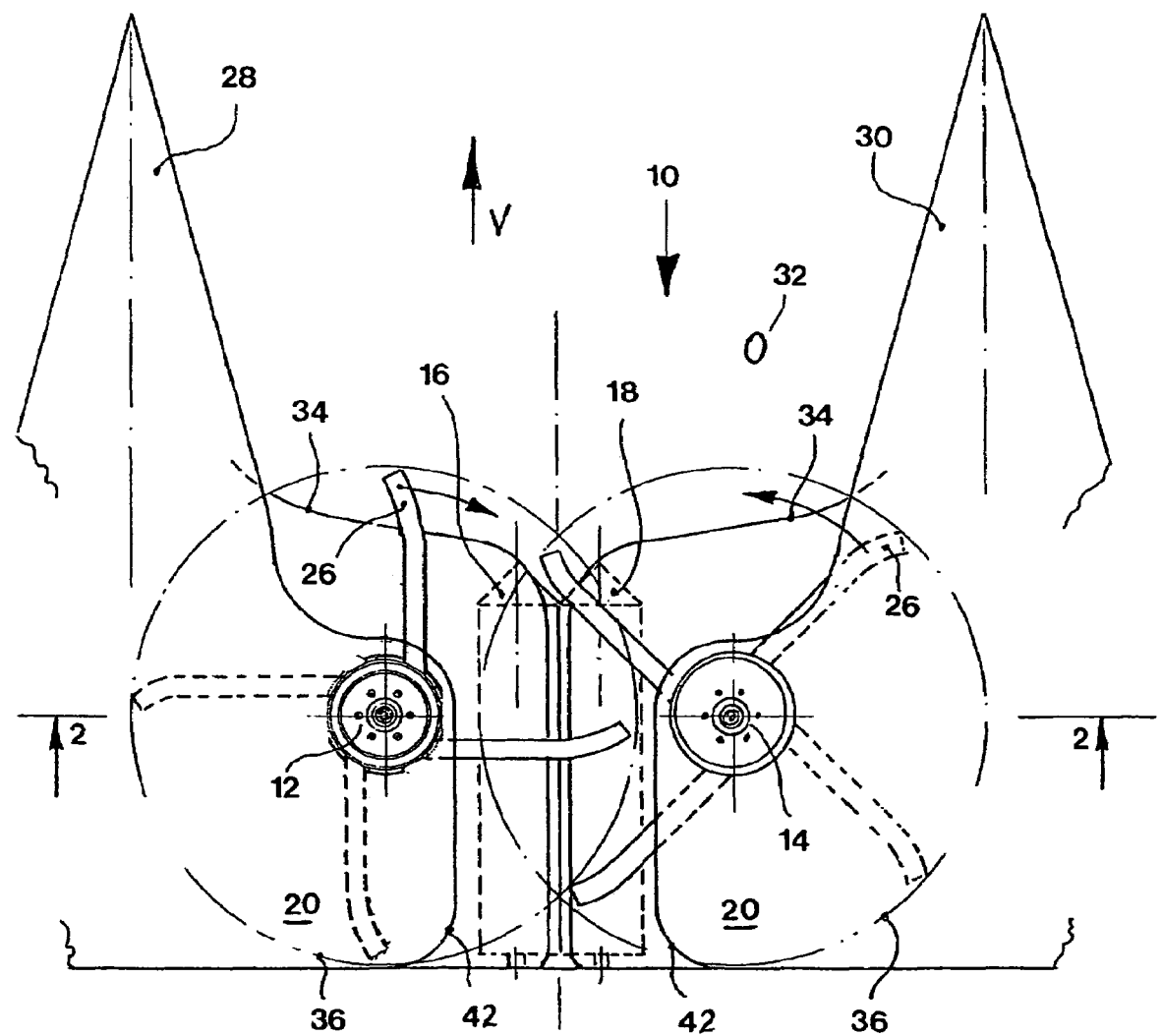
FIG. 1 is a schematic top view of a gathering and picking device.

FIG. 1 shows a gathering and picking device 10 of a harvester. The complete harvester usually comprises a series of gathering and picking devices 10. However, it would also be conceivable to provide the harvester with only one individual gathering and picking device 10.

Figure 3:
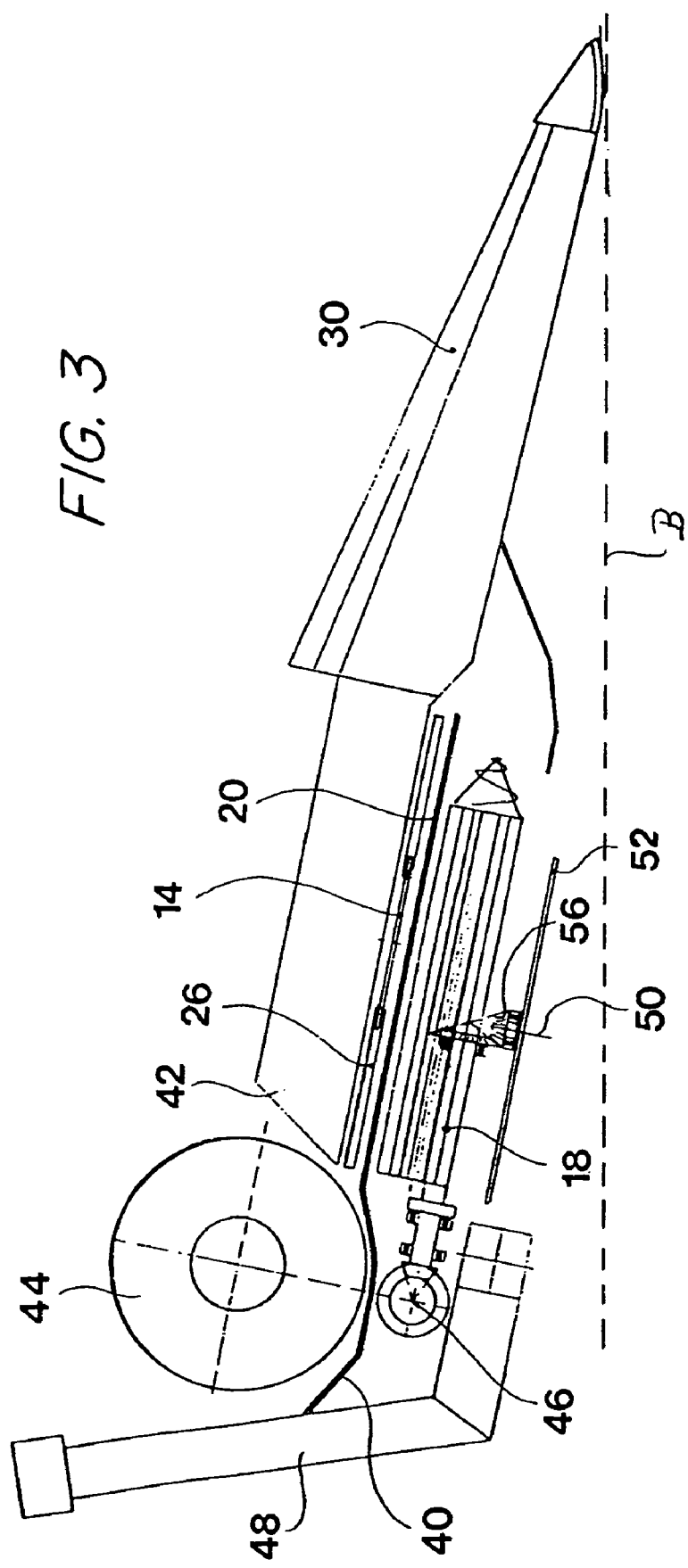
FIG. 3 is a schematic side view of the gathering and picking device according to FIG. 1.

The gathering and picking device 10 contains a first gathering element 12 and a second gathering element 14 for grasping and drawing in the plants to be harvested, as well as a first picking roll 16 and a second picking roll 18 that are arranged underneath a picking gap 22 in a stripping plate 20. With respect to the forward driving direction V, the first gathering element 12 is situated on the left side of the picking gap 22 and the second gathering element 14 is arranged on the right side of the picking gap 22. The first gathering element 12 and the second gathering element 14 are arranged such that they are rotatable about approximately vertical and parallel axes, and can be set in rotation by their assigned drives, which are not illustrated in the figures. According to FIG. 1, the first gathering element 12 rotates in the clockwise direction and the second gathering element 14 rotates in the counterclockwise direction. The axes of rotation of the gathering elements 12 and 14 are each the same distance away from the rear side of the gathering and picking device 10. The gathering elements 12 and 14 are arranged above the stripping plate 20 at the same height, and have axes of rotation that are inclined slightly forward, with respect to the forward driving direction V, because the stripping plate 20 is inclined slightly forward and downward relative to the ground B during operation of the device, as indicated in FIG. 3.

The gathering elements 12 essentially comprise shafts 24 that define the axes of rotation, and finger-like carrier elements 26 that essentially extend radially and are distributed over the circumference of the shafts. These carrier elements are curved opposite to their respective rotational directions in their plane, i.e. they are curved in a trailing fashion. This means that the carrier elements 26 of the two gathering elements 12 and 14 are, due to the different rotational directions, realized in mirror-image fashion and have a repelling conveying characteristic. The shafts 24 are driven synchronously, i.e. with the same rotational speed, in order to prevent collisions within the overlapping envelopes 36 of the carrier elements 26 of the gathering elements 12 and 14. In addition, the carrier elements 26 of both gathering elements 12 and 14 in the illustrated embodiment are angularly offset relative to one another by approximately 45 degrees.

Alternatively or additionally to the curvature of the fingers 26, it would also be conceivable to realize a controlled radial and/or azimuthal movement of the fingers 26 relative to the shafts 24, as is known, for example, from the reel prongs or fingers on screw conveyors of cutting mechanisms. In this case, a repelling conveying characteristic could be achieved with the aid of an eccentric drive or the like.

According to FIG. 1, which shows a top view of the gathering and picking device 10, stalk dividers 28 and 30 are arranged upstream of the gathering elements 12 and 14 with respect to the forward driving direction V of the harvester. These stalk dividers respectively press and bend inward standing plants 32 that are not situated exactly in front of a gathering element 12 or 14 while the gathering and picking device 10 is moved over the field in the forward driving direction V, so that these plants arrive within the effective range of the gathering elements 12 and 14. The leading edge 34, with respect to the forward driving direction, of the stripping plate 20 is also curved such that the stalks of the plants 32 are pressed into the effective range of the gathering elements 12 and 14. The operating envelopes 36 and consequently the effective ranges of the gathering elements 12 and 14 are large enough so that, in cooperation with the curved leading edge 34 of the stripping plate 20 and the stalk dividers 28 and 30, the gathering and picking device 10 operates independently of the crop rows. The operating width of the gathering and picking device 10 consequently corresponds to the lateral spacing between the tips of the stalk dividers 28 and 30.

The first picking roll 16 is arranged laterally adjacent to the gathering element 12 and is inclined slightly forward and downward. With respect to the lateral direction, the first picking roll is oriented parallel to the forward driving direction V. With respect to vertical direction, the first picking roll 16 is arranged underneath the stripping plate 20. The second picking roll 18 is situated on the other side of the picking gap 22 and is structurally identical to the first picking roll 16. The gap defined between the first picking roll 16 and the second picking roll 18 is arranged vertically beneath the picking gap 22. The picking rolls 16 and 18 are equipped with gripping ribs 38 that extend over the length of the picking rolls and are driven in opposite directions, forming a picking unit that draws the plants 32 downward into the picking gap 22. The stripping plate 20 serves to strip the useful parts off the standing plants 32.

The function of the gathering elements 12 and 14 is illustrated quite clearly in FIG. 1. The stalk of a plant 32 standing on the field comes in contact with a carrier element 26 of the gathering element 12 or 14 after having been (depending on its lateral position) bent in the direction of the picking gap 22 by the stalk dividers 28 or 30 and/or the leading edge 34 of the stripping plate 20. The stalk is carried along by the leading surface of the carrier element 26 and pressed inward due to the trailing and consequently repelling curvature of the carrier element 26. The stalk of the plant 32 is conveyed into the picking gap 22 by the carrier element 26 in this fashion, the picking gap extending at least approximately parallel to the forward driving direction V and being situated in the stripping plate 20 between the picking rolls 16 and 18 and the gathering elements 12 and 14. This also causes the plant 32 that is not yet separated from the soil of the field to be bent. If so required, the plant may subsequently be separated from the soil by means of a chopping knife 52 (see FIG. 3) that is arranged underneath the picking rolls 16 and 18.

The stalk of the plant 32 is conveyed into the effective range of both picking rolls 16 and 18 by the gathering element 12 or 14. The front tips of the picking rolls lie in front (with respect to the forward driving direction V) of the axes of rotation of the gathering elements 12 and 14. The tips of the picking rolls 16 and 18 have a conical shape. They may also be provided with endless screws in order to better introduce the plants 32 into the picking gap 22. During the picking process, the carrier elements 26 of the gathering elements 12 and 14 convey the plants 32 over the length of the picking gap 22. The rotational speeds of the picking rolls 18 and 20 and of the gathering elements 12 and 14 are preferably chosen such that the entire plant 32 is drawn downward into the picking gap 22 when it reaches the end of the picking gap 22. The symmetrical arrangement of the gathering elements 12 and 14 makes it possible to effortlessly introduce the plants 32 into the picking gap 22. In addition, the operating width can be increased in comparison with embodiments with only one gathering element, or smaller gathering elements 12 and 14 can be used to process the same operating width.

The useful parts of the plant 32 separated by means of the picking device, e.g. corn ears, fruits of sunflowers, etc., are conveyed by the gathering elements 12, 14 into a trough 40 arranged on the rear side of the gathering and picking device 10. A cover 42 on both sides of the picking gap 22 defines a channel leading to the trough 40. The useful parts of the plants 32 are conveyed through this channel. The cover 42 partially covers the gathering elements 12 and 14 and improves the functional and operational reliability of the gathering and picking device 10 due to its shielding effect. The trough 40 may be realized integrally with the stripping plate 20, or be a separate component. A screw conveyor 44 that is arranged above the trough 40 and oriented transversely to the forward driving direction conveys the useful parts to a harvesting vehicle (e.g., a combine harvester or field chopper) or onto a trailer. A shaft 46 that serves to drive the two picking rolls 16 and 18, the chopping knife 52 and the gathering elements 12 and 14 of the gathering and picking devices 10 is arranged underneath the trough 40. The shaft 46 is connected to and driven by the engine of a motor vehicle that carries the harvester. A frame 48 carries the gathering and picking devices 10 of the harvester, all of which are driven by the shaft 46.

The remains of the plants 32 that are conveyed downward by the picking rolls 16 and 18 reach the effective range of the rotating four-armed chopping knife 52 and are chopped into individual pieces. This means that chopped crop residue is returned onto the field. The picking rolls 16 and 18 hold the plant 32 during the chopping process. As indicated in FIG. 3, the chopping knife 52 rotates about a vertical axis of rotation 50 that with respect to the forward driving direction V is arranged between the axis of rotation of the gathering element 12 and the screw conveyor 44, said chopping knife being driven by the shaft 46 via an angular gear 56. With respect to the vertical direction, the chopping knife 52 is positioned underneath the picking rolls 16 and 18. With respect to FIG. 1, the chopping knife 14 rotates in the clockwise direction such that the chopped crop residue is thrown laterally backwards.

Having described the illustrated embodiment, it will become apparent that various modifications can be made without departing from the scope of the invention as defined in the accompanying claims.

The invention claimed is:

1. A gathering and picking device for standing plants having useful parts comprising:
   a picking gap defined by a stripper plate, the picking gap having an inlet for receiving standing plants and having a first side and a second side opposite the first side, the picking gap also having a length;
   a first gathering element is arranged on the first side of the picking gap and is rotated about a predominantly vertical first single axis, the first gathering element is provided with carrier elements that are designed to grasp the standing plants as the gathering and picking device is being operated, as well as for introducing the plants into the picking gap and for conveying the plants over at least part of the length of the picking gap;
   a picking unit is operated to convey the standing plants downward through the picking gap so the useful parts of the standing plants are separated from the standing plants by the stripper plate; and
   a second gathering element is arranged on the second side of the picking gap opposite to the first gathering element, the second gathering element also rotated about a predominantly vertical second single axis and are provided with carrier elements that are designed for grasping the standing plants, introducing the plants into the picking gap, and conveying the plants over at least part of the length of the picking gap.

2. A gathering and picking device as defined by claim 1 wherein the first gathering element and the second gathering element are designed for grasping standing plants that stand laterally adjacent to the picking gap, and for introducing the standing plants into the picking gap.

3. A gathering and picking device as defined by claim 1 wherein the first gathering element has an operating envelope and the second gathering element has an operating envelope, the operating envelopes of the first and second gathering elements overlap.

4. A gathering and picking device as defined by claim 1 wherein the first and the second gathering elements are driven synchronously.

5. A gathering and picking device as defined by claim 4 wherein the carrier elements of the first and the second gathering elements are angularly offset relative to one another.

6. A gathering and picking device as defined by claim 1 wherein the picking gap has an effective length and the first and the second gathering element are designed for conveying the standing plants along the effective length of the picking gap.

\* \* \* \* \*